United States Patent [19]

Duck et al.

[11] 4,165,150
[45] Aug. 21, 1979

[54] LOW LOSS DIRECTIONAL COUPLING FOR OPTICAL FIBRES

[75] Inventors: Gary S. Duck, Ottawa; Frederick D. King, Smith Falls, both of Canada

[73] Assignee: Northern Telecom Limited, Montreal, Canada

[21] Appl. No.: 895,001

[22] Filed: Apr. 10, 1978

[51] Int. Cl.$^2$ .............................. G02B 5/14
[52] U.S. Cl. ................................ 350/96.15
[58] Field of Search ............ 350/96.15, 96.16, 96.10

[56] References Cited

U.S. PATENT DOCUMENTS

| 4,054,366 | 10/1977 | Barnoski et al. | 350/96.15 |
| 4,087,156 | 5/1978 | Kao et al. | 350/96.15 |

FOREIGN PATENT DOCUMENTS 7613741 1/1977 Netherlands .................. 350/96.15

OTHER PUBLICATIONS

Ozeki et al. articles "Optical Directional Coupler Using Tapered Sections in Multimode Fibers" in *Applied Phys. Letts.* vol. 28, No. 9, May 1976, pp. 528-529.

Primary Examiner—Stewart J. Levy
Attorney, Agent, or Firm—Sidney T. Jelly

[57] ABSTRACT

Low loss directional coupling of optical fibres is obtained by wrapping a tap fibre round a trunk fibre. Any cladding is first removed and then the tap fibre wrapped round the trunk fibre. The tap ratio can be varied by a variation in the number of turns or twists of the tap fibre around the trunk fibre. Signals can be abstracted by the tap fibre and also inserted.

10 Claims, 5 Drawing Figures

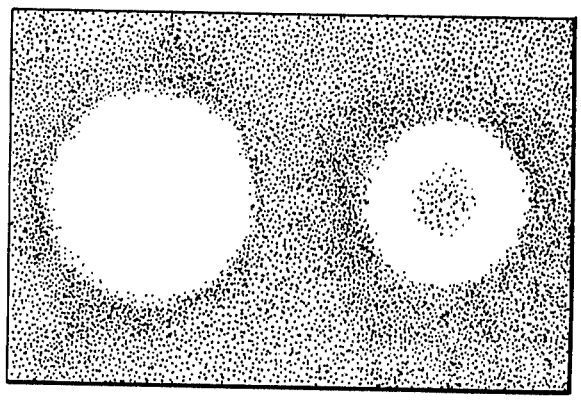
Fig-5-
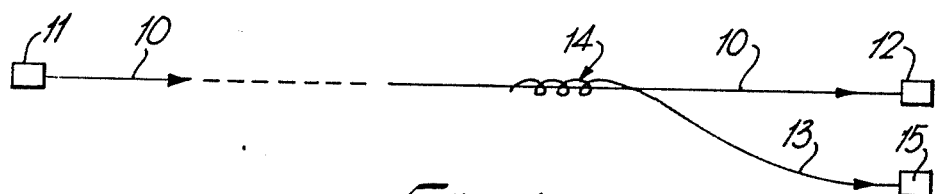
Fig-1-
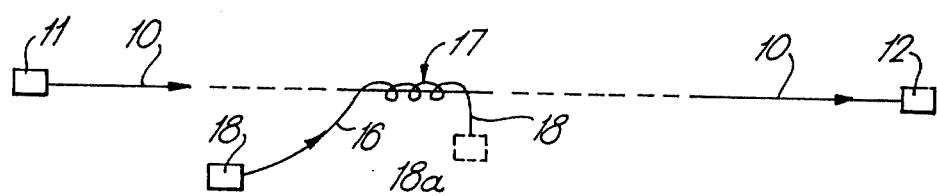
Fig-2-
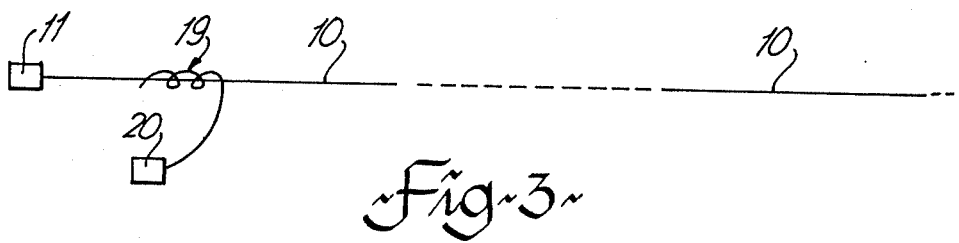
Fig-3-

LOW LOSS DIRECTIONAL COUPLING FOR OPTICAL FIBRES

This invention relates to a low loss coupling for optical fibres, and particularly for coupling light into or out of a truck fibre.

It is often necessary to couple a fibre to a trunk fibre and various arrangements exist, such as connecting the fibres into dividers and the like. The objective is to obtain such coupling with the minimum of signal loss. Also, conventional couplers have to be individually designed, depending upon the desired ratio between the continuing trunk signal and the coupled out signal. The various arrangements are often complex and require careful and accurate manufacture and assembly.

The present invention provides an extremely simple and readily variable coupling of a fibre to a further fibre, with a very low signal loss. The tap fibre is wrapped round the trunk fibre, after removal of the cladding from the section of both fibres to be wrapped. The tap ratio, that is the ratio between the trunk fibre output relative to the tap fibre output, and also the ratio between the trunk fibre input and the tap fibre input, can be varied considerably.

The invention will be readily understood by the following description in conjunction with the accompanying drawings, in which:

FIG. 1 is a diagrammatic illustration of a coupling arrangement for coupling light out;

FIG. 2 is a diagrammatic illustration of a coupling arrangement for coupling light in;

FIG. 3 is a diagrammatic illustration of a coupling arrangement for coupling light out for monitoring the signal in the trunk;

FIG. 5 illustrates the output from the two parts of a coupling.

Figure 4:
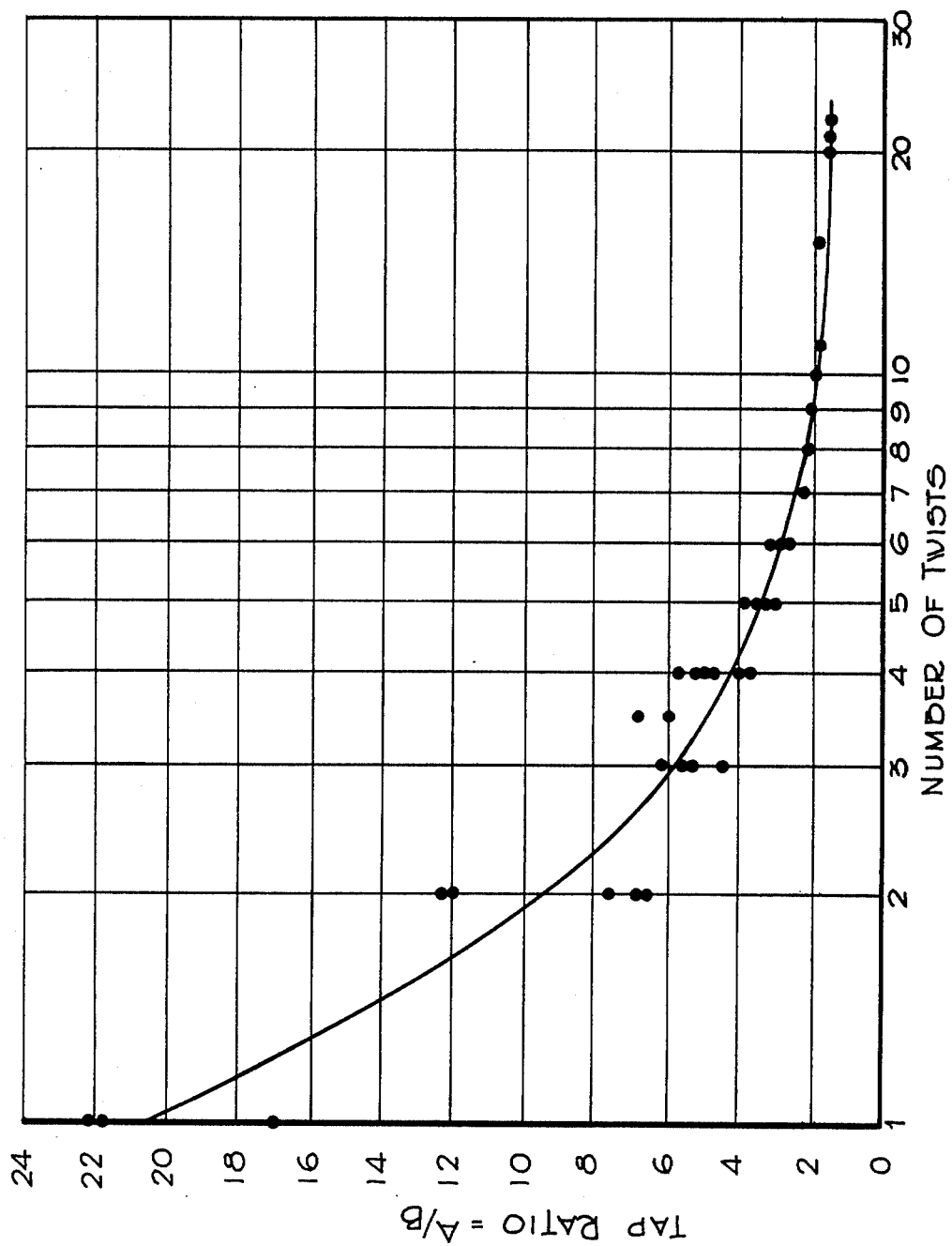
FIG. 4 is a curve illustrating the relationship between tap ratio and number of twists of the tap fibre around the main fibre.

As illustrated in FIG. 1, a main or trunk fibre is indicated at 10, with a light emitting diode (LED) or laser input device at 11 and a detector at 12. A tap fibre is indicated at 13, with the twists of the tap fibre around the main fibre indicated at 14. A detector is indicated at 15 for the tap fibre 13. In the particular example, fibres 10 and 13 have a silica core and a silicone cladding—typical material being that sold under the trademark Supra Sil-1 for the core and GE 670 for the cladding. To make the coupling, first the silicone cladding was stripped off a section (whose length depended on the tap ratio desired) of both the trunk fibre and the tap fibre. This can be done with metal strippers and it can also be done chemically by heating in tetramethylguanidine for 1 hour at 100° C. The stripped section of the tap fibre was then twisted around that of the trunk fibre. No fusing or heating was required. Over 30 splices were made with a varying number of twists. Some of the splices were protected by re-covering them again in silicone.

FIG. 2 illustrates an arrangement for coupling in to the trunk fibre 10. The fibre inserting the signal is indicated at 16 with its input device at 18, the wrap turns indicated at 17. The losses for the arrangement of FIG. 2 will be somewhat higher than for the arrangement of FIG. 1, as some light will propagate right through fibre 16 and issue at 18. It is possible to use the output at 18 to monitor the signal in the trunk fibre by a detector 18a.

FIG. 3 illustrates the use of a coupling out tap at 19 to provide a monitoring signal at 20. By applying the coupling near the input device 11, there is very little loss at the detector 12, as those modes and the leaky wavelengths which are rapidly lost in a normal trunk fibre, will be abstracted by the coupling 19.

Other forms of fibre than the silica core/silicone cladding can be used, for one or other, or both fibres, that is trunk fibre and tap fibre. Thus silica core/silica clad fibres, usually with a plastic coating, can be used. The plastic coating is first removed, as by burning, and then the silica cladding etched away.

FIG. 4 shows a curve of tap ratio versus the number of twists for an arrangement as in FIG. 1. The length of the coupling section varied approximately linearly with the number of twists. All the couplings were made with about two twists per inch. The tap ratio—A/B—is the ratio of the continuing signal, or output signal, in the trunk fibre (A) related to the signal in the tap fibre (B).

A most important parameter in determining the loss of the coupling is the cleanliness of the fibre surfaces after stripping the silicone. Light lost because of surface contamination can be almost totally regained by proper cleaning. The loss for couplings as in FIG. 1 was found to be approximately 0.1 dB or less. Protecting the coupling by re-covering with silicone has little or no effect on the tap ratio or the loss.

FIG. 5 shows a picture of the output from the two ports of a typical coupling (tap ratio of ~2.5:1) as in FIG. 1, when the light source was a HeNe laser focussed through a 45× microscope lens into the fibre, the ports being the output ends of the fibres 10 and 13.

The actual pitch of the twists of the tap fibre depends upon the flexibility of the tap fibre, which in turn depends upon the material of the fibre, and its diameter. Some materials are much more flexible than others and it has been proposed to use synthetic plastic material for the core of optical fibres. The diameter of the main fibre 10 will also have an influence upon the pitch of the twists. The cladding material can, of course, vary also.

The method of coupling light into or out from a main or trunk fibre has the advantages of simplicity, low loss, and having a controllable and wide range of tap ratio.

What is claimed is:

1. A low loss directional coupling for optical fibres comprising a first fibre and a second fibre, the second fibre wrapped round the first fibre a predetermined number of turns, any cladding layer on the fibres removed whereby the light transmitting cores of the fibres are in contact.

2. A coupling as claimed in claim 1, for coupling light into the first fibre, and including a light emitting device at an input end of the second fibre.

3. A coupling as claimed in claim 2, including a monitoring device at an output end of the second fibre.

4. A coupling as claimed in claim 1, for coupling light out of the first fibre, including a detector at an output end of the second fibre.

5. A coupling as claimed in claim 1, for monitoring a signal in the first fibre, including a monitoring device at an output end of the second fibre.

6. A coupling as claimed in claim 4, the number of wrapped turns of the second fibres varied in dependence on the desired ratio between the output of the first fibre and the output of the second fibre, the number of turns increased for a decrease in said ratio.

7. A coupling as claimed in claim 2, the number of wrapped turns of the second fibre varied in dependence on the desired ratio between the input of the first fibre and the input of the second fibre, the number of turns increased for a decrease in said ratio.

8. A method of directionally coupling a first optical fibre to a second optical fibre, comprising removing any cladding layer from a portion of each fibre and wrapping said portion of said second fibre round said portion of said first fibre for a predetermined number of turns.

9. A method as claimed in claim 8, for coupling light into said first fibre, including varying the number of wrapped turns to vary the ratio between the input of the first fibre and the input of the second fibre.

10. A method as claimed in claim 8, for coupling light out of said first fibre, including varying the number of wrapped turns to vary the ratio between the output of the second fibre.

* * * * *